(12) United States Patent
Milliron

(10) Patent No.: US 10,029,174 B2
(45) Date of Patent: Jul. 24, 2018

(54) DICE ROLLING SYSTEM

(71) Applicant: Joshua Milliron, Irwin, PA (US)

(72) Inventor: Joshua Milliron, Irwin, PA (US)

( * ) Notice: Subject to any disclaimer, the term of this patent is extended or adjusted under 35 U.S.C. 154(b) by 173 days.

(21) Appl. No.: 15/081,322

(22) Filed: Mar. 25, 2016

(65) Prior Publication Data

US 2017/0274276 A1    Sep. 28, 2017

(51) Int. Cl.
*A63F 13/213*    (2014.01)
*A63F 9/04*    (2006.01)

(52) U.S. Cl.
CPC .......... *A63F 13/213* (2014.09); *A63F 9/0468* (2013.01)

(58) Field of Classification Search
USPC ............................................. 463/16; 273/146
See application file for complete search history.

(56) References Cited

U.S. PATENT DOCUMENTS

| | | |
|---|---|---|
| D258,600 S | 3/1981 | Case |
| 5,331,145 A | 7/1994 | Weckler et al. |
| 6,609,710 B1 | 8/2003 | Order |
| 8,210,924 B2 | 7/2012 | Hsu |
| 8,684,812 B2 * | 4/2014 | Kishi .................... A63F 9/0468 273/146 |
| 9,595,169 B2 * | 3/2017 | Lutnick ............... G07F 17/3293 |
| 2005/0215312 A1 | 9/2005 | Tresser et al. |
| 2010/0032896 A1 | 2/2010 | Berlec et al. |

FOREIGN PATENT DOCUMENTS

WO    WO0015313    3/2000

* cited by examiner

*Primary Examiner* — Pierre E Elisca

(57) ABSTRACT

A dice rolling system includes an electronic gaming unit that may be manipulated to play electronic games. A pair of dice is provided and each of the pair of dice may be tossed during game play. A dice unit is provided and the dice unit may be positioned on a support surface. The dice unit is electrically coupled to the electronic gaming unit. Each of the dice is tossed onto the dice unit. The dice unit includes an optical reader and the optical reader reads indicia on the dice when the dice are tossed onto the dice unit. Thus, the optical reader may determine a number rolled with the pair of dice. The dice unit communicates the number to the electronic gaming unit. Thus, the number may be incorporated into a game played on the electronic gaming unit.

7 Claims, 3 Drawing Sheets

DICE ROLLING SYSTEM

BACKGROUND OF THE DISCLOSURE

Field of the Disclosure

The disclosure relates to dice rolling devices and more particularly pertains to a new dice rolling device for incorporating physically rolled dice into an electronic game.

SUMMARY OF THE DISCLOSURE

An embodiment of the disclosure meets the needs presented above by generally comprising an electronic gaming unit that may be manipulated to play electronic games. A pair of dice is provided and each of the pair of dice may be tossed during game play. A dice unit is provided and the dice unit may be positioned on a support surface. The dice unit is electrically coupled to the electronic gaming unit. Each of the dice is tossed onto the dice unit. The dice unit includes an optical reader and the optical reader reads indicia on the dice when the dice are tossed onto the dice unit. Thus, the optical reader may determine a number rolled with the pair of dice. The dice unit communicates the number to the electronic gaming unit. Thus, the number may be incorporated into a game played on the electronic gaming unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
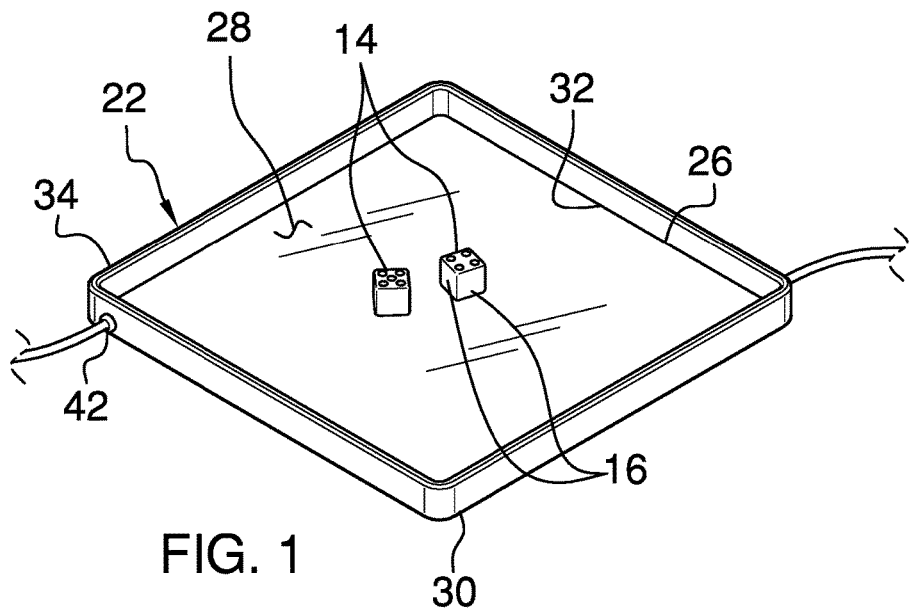
FIG. 1 is a top perspective view of a dice rolling system according to an embodiment of the disclosure.
Figure 2:
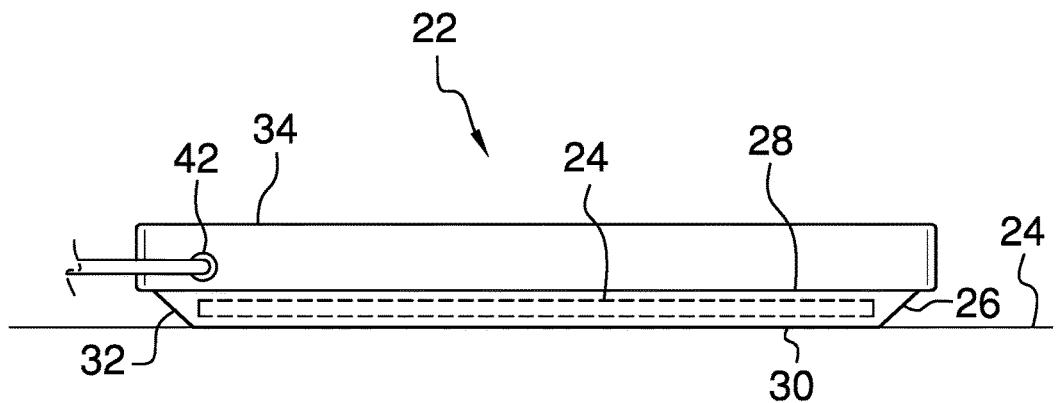
FIG. 2 is a front phantom view of an embodiment of the disclosure.
Figure 3:
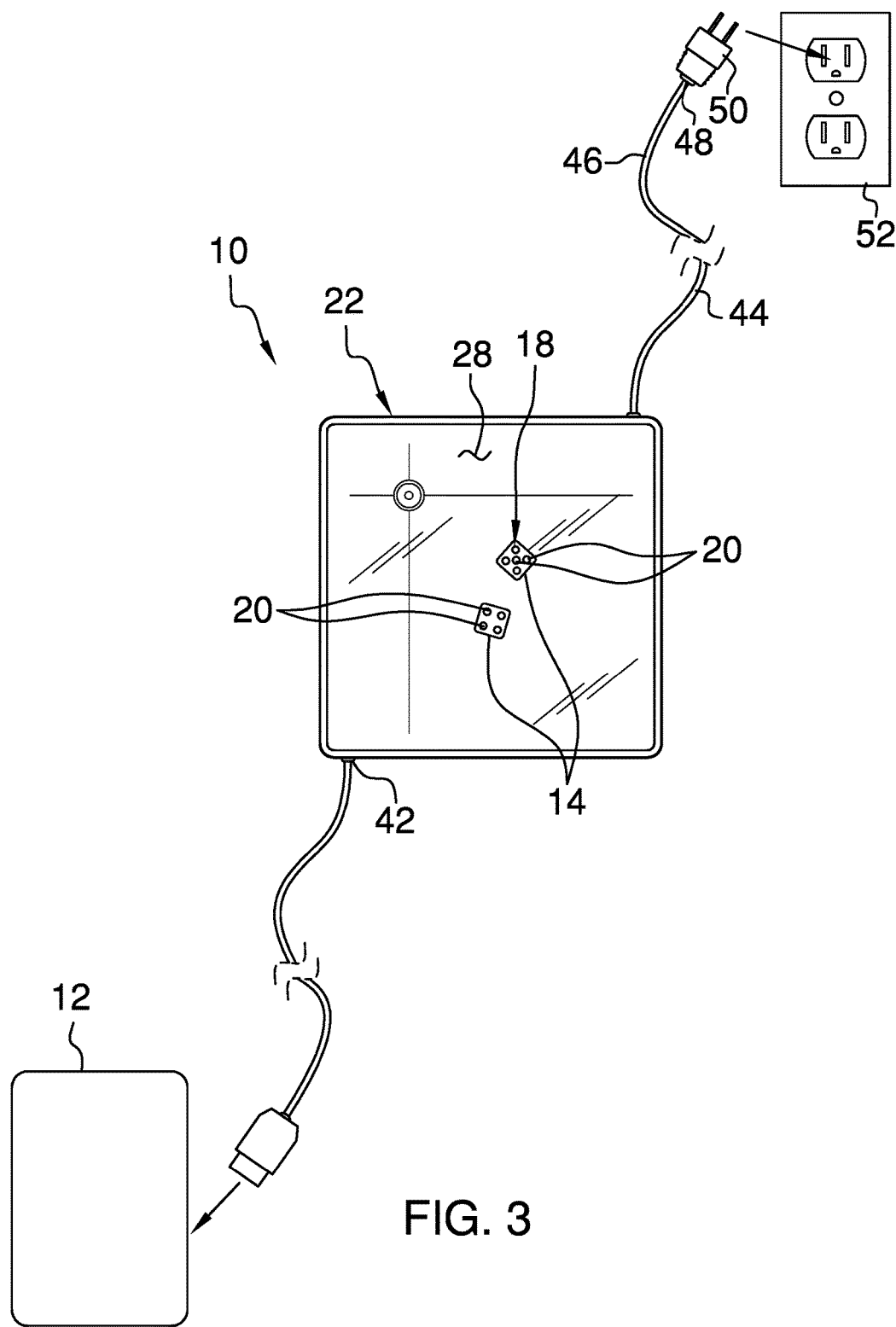
FIG. 3 is a top view of an embodiment of the disclosure.
Figure 4:
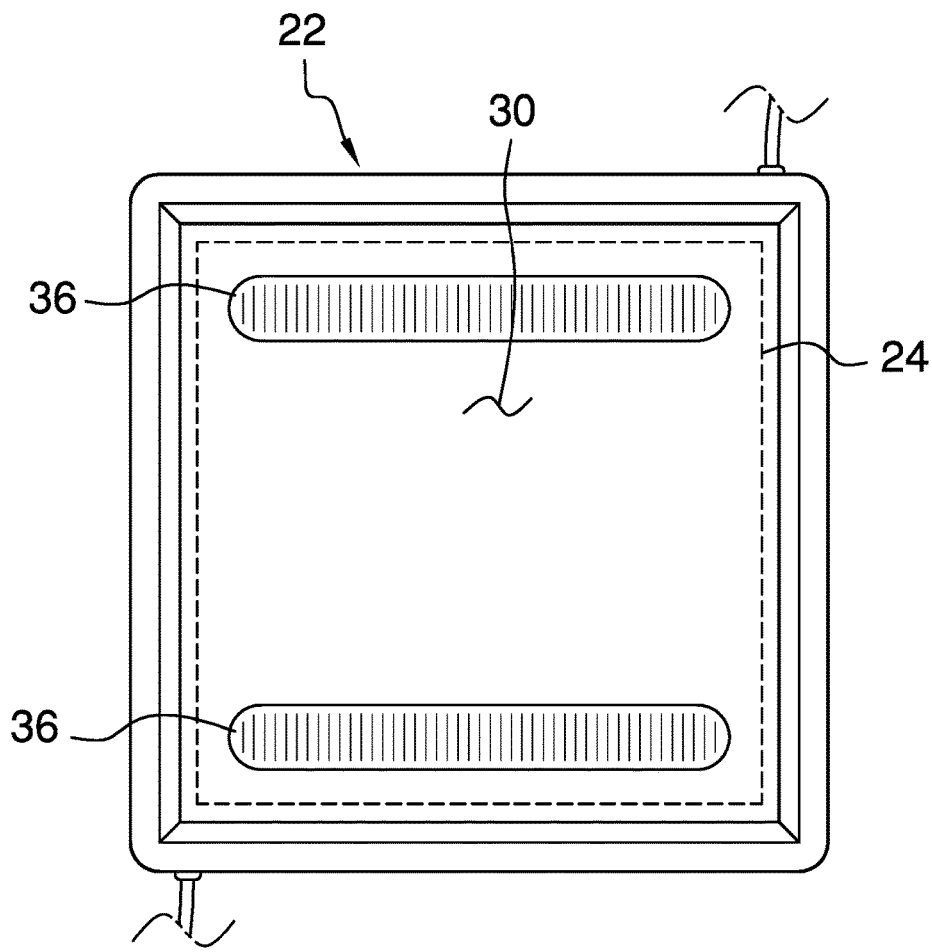
FIG. 4 is a bottom phantom view of an embodiment of the disclosure.
Figure 5:
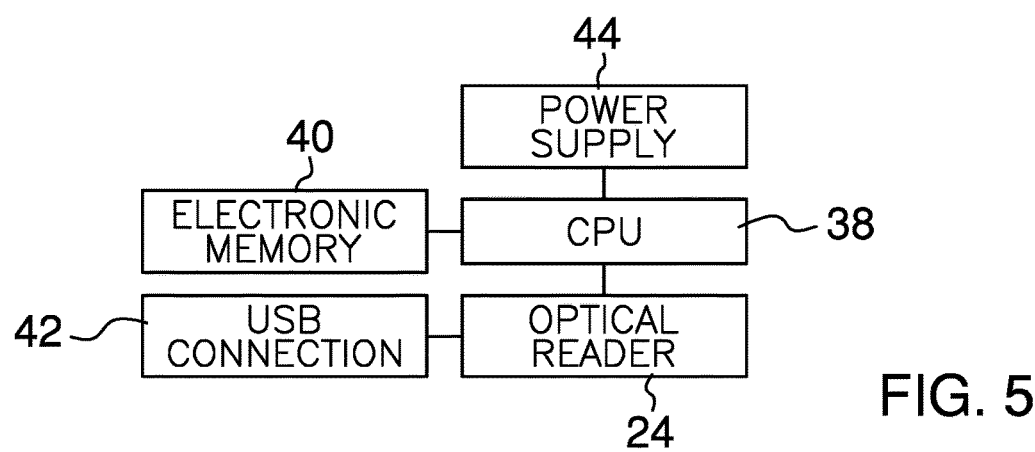
FIG. 5 is a schematic view of an embodiment of the disclosure.

With reference now to the drawings, and in particular to FIGS. 1 through 5 thereof, a new dice rolling device embodying the principles and concepts of an embodiment of the disclosure and generally designated by the reference numeral 10 will be described.

As best illustrated in FIGS. 1 through 5, the dice rolling system 10 generally comprises an electronic gaming unit 12 that may be manipulated to play electronic games. The electronic gaming unit 12 may comprise a Microsoft Xbox, a Sony Playstation or other electronic gaming unit. A pair of dice 14 is provided and each of the pair of dice 14 may be tossed during game play. Each of the pair of dice 14 has a plurality of sides 16. Each of the plurality of sides 16 corresponding to each of the dice 14 has indicia 18 printed thereon. The indicia 18 comprise dots 20 to indicate a number between one and six.

A dice unit 22 is provided. The dice unit 22 may be positioned on a support surface 24. The support surface 24 may be a table top or the like. The dice unit 22 is electrically coupled to the electronic gaming unit 12 and each of the dice 14 is tossed onto the dice unit 22.

The dice unit 22 includes an optical reader 24. The optical reader 24 reads the indicia 18 on the dice 14 when the dice 14 are tossed onto the dice unit 22. Thus, the optical reader 24 determines a number rolled with the pair of dice 14. The dice unit 22 communicates the number to the electronic gaming unit 12. Thus, the number may be incorporated into a game being played on the electronic gaming unit 12.

The dice unit 22 comprises a panel 26 that has a top surface 28, a bottom surface 30 and a peripheral edge 32 extending therebetween. The bottom surface 30 may be positioned on the support surface 24. A lip 34 extends upwardly from the top surface 28 and the lip 34 is coextensive with the peripheral edge 32. The lip 34 retains the dice 14 on the top surface 28 when the dice 14 are tossed onto the top surface 28.

A pair of pads 36 is each coupled to the bottom surface 30 of the panel 26. Each of the pads 36 frictionally engages the support surface 24 when the panel 26 is positioned on the support surface 24. Each of the pads 36 may be comprised of a resiliently compressible material. Thus, each of the pads 36 inhibits the panel 26 from sliding on the support surface 24.

The top surface 28 is comprised of a translucent material. Thus, the dice 14 are visible through the top surface 28 when the dice 14 are tossed onto the top surface 28. A processor 38 is positioned within the panel 26 and the processor 38 includes an electronic memory 40. The electronic memory 40 stores data relating to the indicia 18 on each of the sides 16 corresponding to each of the dice 14. The processor 38 may comprise an electronic processor or the like.

The optical reader 24 is positioned between the top surface 28 and the bottom surface 30 of the panel 26. Thus, the optical reader 24 reads the indicia 18 corresponding to sides 16 of the dice 14 that abut the top surface 28 when the dice 14 are tossed onto the top surface 28. The optical reader 24 is electrically coupled to the processor 38. Thus, the optical reader 24 communicates the indicia 18 abutting the top surface 28 to the processor 38. The optical reader 24 may comprise an electronic optical reader or the like.

The processor 38 compares the indicia 18 communicated by optical reader 24 against the data stored in the electronic memory 40. The processor 38 determines the indicia 18 on an opposite side of each of the dice 14 with respect to the sides 16 abutting the top surface 28. Thus, the processor 38 determines the number rolled with the dice 14.

A data port 42 is coupled to the panel 26 and the data port 42 is electrically coupled to the processor 38. The data port 42 is electrically coupled to the electronic gaming unit 12. Thus, the processor 38 may communicate the number rolled with the dice 14 to the electronic gaming unit 12. The data port 42 may comprise a usb port or the like. A usb cable may be electrically coupled between said data port 42 and the electronic gaming unit 12.

A power supply 44 is positioned within the panel 26 and the power supply 44 is electrically coupled to the processor 38. The power supply 44 comprises a power cord 46 extending outwardly from the panel 26. The power cord 46 has a distal end 48 with respect to the panel 26 and a plug 50 is electrically coupled to the distal end 48. The plug 50 may be electrically coupled to a power source 52. The power source 52 may comprise an electrical outlet or the like.

In use, the electronic gaming unit 12 is manipulated to play an electronic game involving dice 14. The panel 26 is positioned on the support surface 24 and the data port 42 is electrically coupled to the electronic gaming unit 12. The dice 14 are tossed on to the top surface 28 of the panel 26 during game play. The optical reader 24 reads the dice 14 and the processor 38 communicates the number rolled with the dice 14 to the electronic gaming unit 12. Thus, the electronic gaming unit 12 incorporates the number rolled with the dice 14 into game play. The dice unit 22 facilitates physically rolled dice 14 to be incorporated into virtual game play. Thus, the physically rolled dice 14 facilitate random generation of numbers rolled by the dice 14.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dice rolling system comprising:
an electronic gaming unit being configured to be manipulated to play electronic games;
a pair of dice, each of said pair of dice being configured to be tossed during game play; and
a dice unit being configured to be positioned on a support surface, said dice unit being electrically coupled to said electronic gaming unit, each of said dice being tossed onto said dice unit, said dice unit including an optical reader, said optical reader reading indicia on said dice when said dice are tossed onto said dice unit wherein said optical reader is configured to determine a number rolled with said pair of dice, said dice unit communicating the number to said electronic gaming unit thereby facilitating the number to be incorporated into a game being played on said electronic gaming unit, wherein said dice unit comprises a panel having a top surface, a bottom surface and a peripheral edge extending therebetween, said bottom surface being configured to be positioned on the support surface, said top surface having a lip extending upwardly therefrom, said lip being coextensive with said peripheral edge, said top surface being comprised of a translucent material such that said dice are visible through said top surface when said dice are tossed onto said top surface.

2. The system according to claim 1, further comprising:
each of said pair of dice having a plurality of sides, each of said plurality of sides corresponding to each of said dice having indicia being printed thereon, said indicia comprising dots wherein said indicia are configured to indicate a number between one and six; and
a processor being positioned within said panel, said processor including an electronic memory, said electronic memory storing data relating to said indicia on each of said sides corresponding to each of said dice.

3. The system according to claim 2, wherein said optical reader is positioned between said top surface and said bottom surface such that said optical reader reads said indicia corresponding to sides of said dice that abut said top surface when said dice are tossed onto said top surface.

4. The system according to claim 3, wherein said optical reader is electrically coupled to said processor such that said optical reader communicates said indicia abutting said top surface to said processor, said processor comparing said indicia communicated by optical reader against said data stored in said electronic memory such that said processor determines said indicia on an opposite side of each of said dice with respect to said sides abutting said top surface wherein said processor determines the number rolled with said dice.

5. The system according to claim 1, further comprising:
a processor being positioned within said panel; and
a data port being coupled to said panel, said data port being electrically coupled to said processor, said data port being electrically coupled to said electronic gaming unit wherein said processor is configured to communicate the number rolled with said dice to said electronic gaming unit.

6. The system according to claim 1, further comprising:
a processor being positioned within said panel; and
a power supply being positioned within said panel, said power supply being electrically coupled to said processor, said power supply comprising a power cord extending outwardly from said panel, said power cord having a distal end with respect to said panel, said distal end having a plug being electrically coupled thereto, said plug being configured to be electrically coupled to a power source.

7. A dice rolling system comprising:
an electronic gaming unit being configured to be manipulated to play electronic games;
a pair of dice, each of said pair of dice being configured to be tossed during game play, each of said pair of dice having a plurality of sides, each of said plurality of sides corresponding to each of said dice having indicia being printed thereon, said indicia comprising dots wherein said indicia are configured to indicate a number between one and six; and
a dice unit being configured to be positioned on a support surface, said dice unit being electrically coupled to said electronic gaming unit, each of said dice being tossed onto said dice unit, said dice unit including an optical reader, said optical reader reading said indicia on said dice when said dice are tossed onto said dice unit wherein said optical reader is configured to determine a number rolled with said pair of dice, said dice unit communicating the number to said electronic gaming unit thereby facilitating the number to be incorporated into a game being played on said electronic gaming unit, said dice unit comprising:

a panel having a top surface, a bottom surface and a peripheral edge extending therebetween, said bottom surface being configured to be positioned on the support surface, said top surface having a lip extending upwardly therefrom, said lip being coextensive with said peripheral edge, said top surface being comprised of a translucent material such that said dice are visible through said top surface when said dice are tossed onto said top surface, a processor being positioned within said panel, said processor including an electronic memory, said electronic memory storing data relating to said indicia on each of said sides corresponding to each of said dice, said optical reader being positioned between said top surface and said bottom surface such that said optical reader reads said indicia corresponding to sides of said dice that abut said top surface when said dice are tossed onto said top surface, said optical reader being electrically coupled to said processor such that said optical reader communicates said indicia abutting said top surface to said processor, said processor comparing said indicia communicated by optical reader against said data stored in said electronic memory such that said processor determines said indicia on an opposite side of each of said dice with respect to said sides abutting said top surface wherein said processor determines the number rolled with said dice, a data port being coupled to said panel, said data port being electrically coupled to said processor, said data port being electrically coupled to said electronic gaming unit wherein said processor is configured to communicate the number rolled with said dice to said electronic gaming unit, and a power supply being positioned within said panel, said power supply being electrically coupled to said processor, said power supply comprising a power cord extending outwardly from said panel, said power cord having a distal end with respect to said panel, said distal end having a plug being electrically coupled thereto, said plug being configured to be electrically coupled to a power source.

* * * * *